US012788002B2

(12) United States Patent
Brown

(10) Patent No.: US 12,788,002 B2
(45) Date of Patent: Nov. 10, 2026

(54) BURROWING ANIMAL TRAPS

(71) Applicant: Thomas Alfred Brown, Calgary (CA)

(72) Inventor: Thomas Alfred Brown, Calgary (CA)

( * ) Notice: Subject to any disclaimer, the term of this patent is extended or adjusted under 35 U.S.C. 154(b) by 0 days.

(21) Appl. No.: 19/076,549

(22) Filed: Mar. 11, 2025

(65) Prior Publication Data

US 2025/0280818 A1 Sep. 11, 2025

Related U.S. Application Data

(60) Provisional application No. 63/563,552, filed on Mar. 11, 2024.

(51) Int. Cl.
*A01M 23/18* (2006.01)

(52) U.S. Cl.
CPC .................................. *A01M 23/18* (2013.01)

(58) Field of Classification Search
CPC ...... A01M 23/00; A01M 23/02; A01M 23/08; A01M 23/14; A01M 23/16; A01M 23/18; A01M 23/20
See application file for complete search history.

(56) References Cited

U.S. PATENT DOCUMENTS 441,677 A * 12/1890 Lovell .................. A01M 23/18 43/61
774,164 A * 11/1904 Elder .................... A01M 23/18 43/67
1,130,667 A * 3/1915 Carlson ................. A01M 23/18 43/61
1,474,096 A * 11/1923 Sorensen ............. A01M 23/20 43/61
1,584,091 A * 5/1926 Harker .................. A01M 23/00 43/71
1,759,048 A * 5/1930 Fisher ................... A01M 23/18 43/61
2,284,867 A * 6/1942 Harris ................... A01M 23/18 43/61
2,529,589 A * 11/1950 Biery .................... A01M 23/18 43/61
2,667,714 A * 2/1954 Vickers ................. A01M 23/20 43/76
3,762,093 A * 10/1973 Rohde ................... A01M 23/16 43/61
4,080,749 A * 3/1978 Gilbaugh .............. A01M 23/16 43/61
4,727,677 A * 3/1988 Mellard ................ A01M 23/18 43/61
5,615,514 A * 4/1997 Meade, Jr. ............ A01M 23/20 43/61
6,389,738 B1 * 5/2002 Denney ................... A01M 1/10 43/58

(Continued)

FOREIGN PATENT DOCUMENTS

GB 165245 A * 6/1921 ............ A01M 23/18

*Primary Examiner* — Carly W. Lynch
(74) *Attorney, Agent, or Firm* — Kirton McConkie; Brian Tucker

(57) ABSTRACT

A burrowing animal trap is provided and is designed to enclose the entrance to a burrow and appear to the animal as an extension of the burrow. As a result, the animal will be likely to enter the animal trap under the mistaken belief that it is exiting the burrow. The burrowing animal trap has a capture mechanism that includes a pivoting trap door.

20 Claims, 8 Drawing Sheets

(56) References Cited

U.S. PATENT DOCUMENTS

| | | | | |
|---|---|---|---|---|
| 6,484,436 | B1 * | 11/2002 | Chang | A01M 23/20 43/67 |
| 6,564,501 | B1 * | 5/2003 | Schislyonok | A01M 23/18 43/61 |
| 6,990,767 | B1 * | 1/2006 | Margalit | A01M 23/20 43/61 |
| 2002/0178647 | A1 * | 12/2002 | Lafforthun | A01M 23/18 43/61 |
| 2007/0277426 | A1 * | 12/2007 | Wolfgram | A01M 23/08 43/67 |
| 2008/0216386 | A1 * | 9/2008 | Le Laidier | A01M 23/20 43/67 |
| 2017/0202204 | A1 * | 7/2017 | Baxter | A01M 23/18 |
| 2020/0138008 | A1 * | 5/2020 | Brown | A01M 23/20 |

* cited by examiner

BURROWING ANIMAL TRAPS

CROSS-REFERENCE TO RELATED APPLICATIONS

This application claims the benefit of and incorporates by reference U.S. Provisional Patent Application No. 63/563,552 which was filed on Mar. 11, 2024.

BACKGROUND

For responsible property management, many jurisdictions require property owners and institutions to control specified animal pests. Even without compulsion, property owners may desire to rid their properties of unwanted pest species whether for their own reasons or as a courtesy to neighbors. Animal pests may be primarily an aesthetic concern but may also present health and safety concerns.

Different solutions exist for control animal pests including, for example, devices that repel, harm, kill or capture the animals. While it is generally accepted as a positive goal to avoid unnecessary harm to animals, harming or killing animals is at times seen as a necessary solution. Otherwise, repelling animals may work for some species but for others a more effective solution may be capture. Once captured, animals may be released to the wild in a different location or may be otherwise disposed of.

Animal traps intended for live capture exist but have limited effectiveness on burrowing animals. Many conventional live animal traps rely on bait to attract the animals into an enclosure. However, due to the unfamiliar appearance of such traps, including for example an unnatural floor, the animals are often frightened away. Additionally, attracting animals into an enclosure can take time and is dependent on the animal's appetite and preference for the bait. Moreover, the bait may attract unintended species which may trigger the trap thereby preventing it from capturing the intended specifies until the trap is reset. These unintended species may even be harmed or killed by the trap.

Even when a trap successfully captures an animal, additional problems exist. For example, many individuals may be scared of or repulsed by the captured animal. Also, many traps have gaps that may allow the captured animal to bite an individual while handling the trap or may expose the individual to unwanted contact with the captured animal. Furthermore, traps may be difficult or dangerous to set. These additional problems may discourage individuals from employing otherwise effective traps.

When animals are captured, there is still a risk that the captured animals may be harmed (e.g., due to wind, sun, rain, extreme temperatures, other predatory animals, etc.) before they can be removed from the traps. Also, when a vehicle is used to transfer captured animals to other locations for release, the vehicle will likely become contaminated with soil or feces.

U.S. Pat. No. 11,723,355, which is incorporated by reference, discloses a burrowing animal trap that addresses at least some of these issues. The present application describes various improvements.

BRIEF SUMMARY

Embodiments of the present disclosure extend to animal traps that can be used to capture burrowing animals. An animal trap configured in accordance with embodiments of the present disclosure is designed to enclose the entrance to a burrow and appear to the animal as an extension of the burrow. As a result, the animal will be likely to enter the animal trap under the mistaken belief that it is exiting the burrow.

In some embodiments, a burrowing animal trap may include an enclosure, a cage floor, a capture mechanism and a trigger mechanism. The enclosure may have a downward-facing opening that is configured to be placed overtop an opening of a burrow. The cage floor may enclose a rear portion of the downward-facing opening to thereby form a frontward-facing opening between the enclosure and the cage floor. The capture mechanism may be configured to selectively cover the frontward-facing opening. The capture mechanism may include a trap door having a top that is connected to the enclosure via a pivoting connection, a front wall that extends downwardly from the top and that is configured to extend into the enclosure to block the frontward-facing opening, and a rear. The front wall and rear may be positioned on opposite sides of the pivoting connection. The trigger mechanism may have a trigger that is positioned within the enclosure and a locking member that rotates with the trigger. The locking member may be configured to interface with the rear of the trap door to retain the front wall in a lifted position until the trigger is rotated.

In some embodiments, the locking member may be configured to rotate overtop the rear of the trap door to retain the front wall in the lifted position.

In some embodiments, the rear may be angled upwardly relative to the top of the trap door.

In some embodiments, the trap door may include opposing sides that extend downwardly from the top. The opposing sides may be connected to the enclosure to form the pivoting connection.

In some embodiments, the front wall of the trap door may have a curved shape.

In some embodiments, the capture mechanism may include a biasing mechanism that biases the trap door to cause the front wall to extend into the enclosure.

In some embodiments, the biasing mechanism may be positioned below the top of the trap door on a rear side of the pivoting connection.

In some embodiments, the biasing mechanism may rotate rearwardly into a vertical orientation under the trap door.

In some embodiments, the top of the trap door may include an opening by which the biasing mechanism may be accessed to rotate the biasing mechanism frontward.

In some embodiments, the enclosure may include a slot through which the front wall of the trap door extends into the enclosure. The burrowing animal trap may further include a slot cover that covers that slot when the front wall is withdrawn from the slot.

In some embodiments, the slot cover may be configured to pivot away from the slot when the front wall extends through the slot and into the enclosure.

In some embodiments, the cage floor may include cross members that extend across the enclosure. Each cross member may have vertical portions and a horizontal portion that extends between the vertical portions. A height of the vertical portions may increase in a frontward direction.

In some embodiments, the height of the vertical portions of the cross members may cause the cross members to extend along a first plane and a top of the enclosure and the top of the trap door may extend along a second plane that is parallel to the first plane.

In some embodiments, the burrowing animal trap may include a bottom cover that selectively couples to the enclosure overtop the downward-facing opening. A bottom of the bottom cover may extend along a plane that is parallel to the first and second planes.

In some embodiments, a burrowing animal trap may include an enclosure, a cage floor, a capture mechanism and a trigger mechanism. The enclosure may have a downward-facing opening that is configured to be placed overtop an opening of a burrow. The enclosure may also have a slot formed on a top of the enclosure. The cage floor may enclose a rear portion of the downward-facing opening to thereby form a frontward-facing opening between the enclosure and the cage floor. The capture mechanism may have a trap door and a biasing mechanism. The trap door may have a top that is connected to the enclosure via a pivoting connection, a front wall that extends downwardly from the top and that is configured to extend through the slot in the enclosure to block the frontward-facing opening, and a rear. The front wall and rear may be positioned on opposite sides of the pivoting connection. The biasing mechanism may apply an upward biasing force on a portion of the trap door that is rearward of the pivoting connection to thereby bias the front wall downwardly through the slot. The trigger mechanism may have a trigger that is positioned within the enclosure and a locking member that interfaces with the trap door to oppose the biasing force until the trigger is moved.

In some embodiments, the biasing mechanism may be connected to the enclosure via a pivoting connection.

In some embodiments, the biasing mechanism may include a tab that is accessible through an opening in the top of the trap door to thereby allow a user to apply a frontward force on the tab.

In some embodiments, the downward-facing opening may extend along a first plane and the cage floor may extend along a second plane. A distance between the first and second plane may increase from a rear of the enclosure to the frontward-facing opening.

In some embodiments, a burrowing animal trap may include an enclosure having a downward-facing opening that is configured to be placed overtop an opening of a burrow, a cage floor that encloses a rear portion of the downward-facing opening to thereby form a frontward-facing opening between the enclosure and the cage floor, a capture mechanism comprising a trap door having a top that is connected to the enclosure via a pivoting connection and a front wall that extends downwardly from the top and pivots downwardly into the enclosure to block the frontward-facing opening, and a trigger mechanism having a trigger that is positioned within the enclosure and a locking member that rotates with the trigger. The locking member may be configured to interface with the trap door to retain the front wall in a lifted position until the trigger is rotated.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

The present disclosure includes the following drawings which represent example and non-limiting embodiments.

DETAILED DESCRIPTION

Figure 1A:
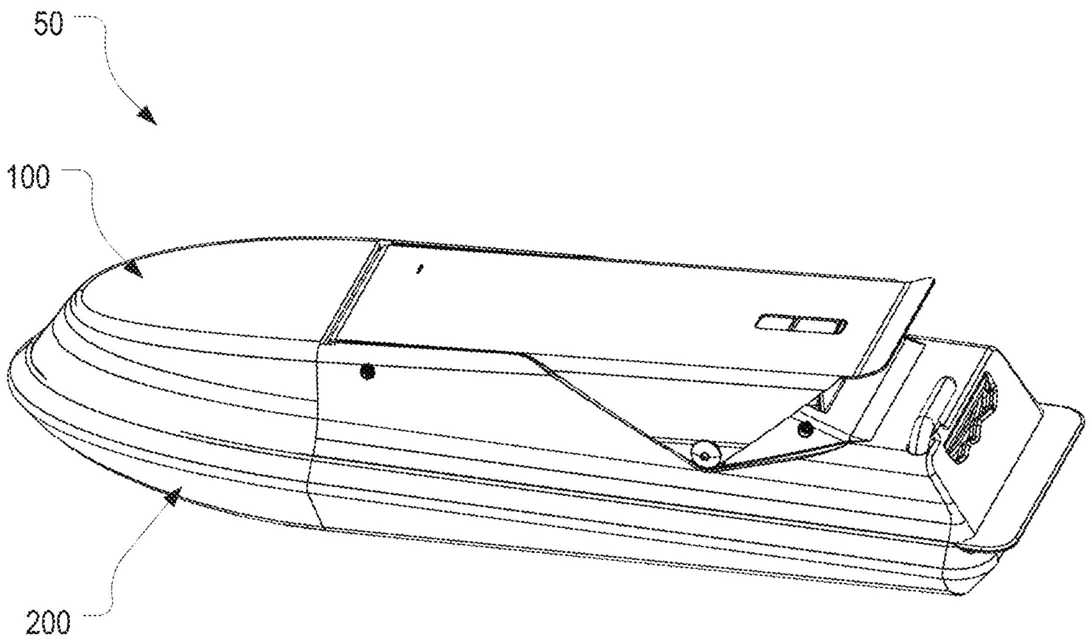
FIGS. 1A and 1B illustrate an example burrowing animal trap that is configured in accordance with one or more embodiments.
Figure 1B:
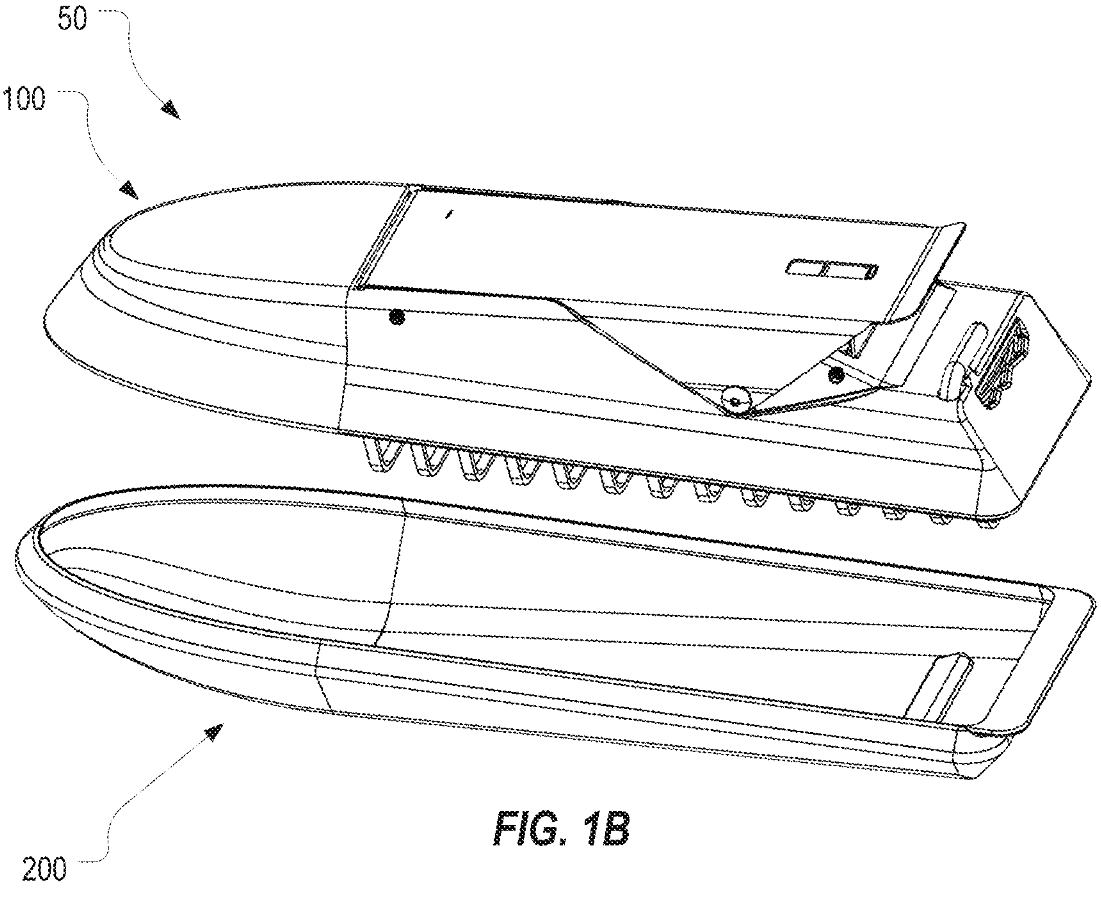

FIGS. 1A and 1B illustrate an example burrowing animal trap 50 that is configured in accordance with one or more embodiments of the present disclosure. Burrowing animal trap 50 has a trap body 100 and a bottom cover 200 that is selectively secured to trap body 100.

Figure 2A:
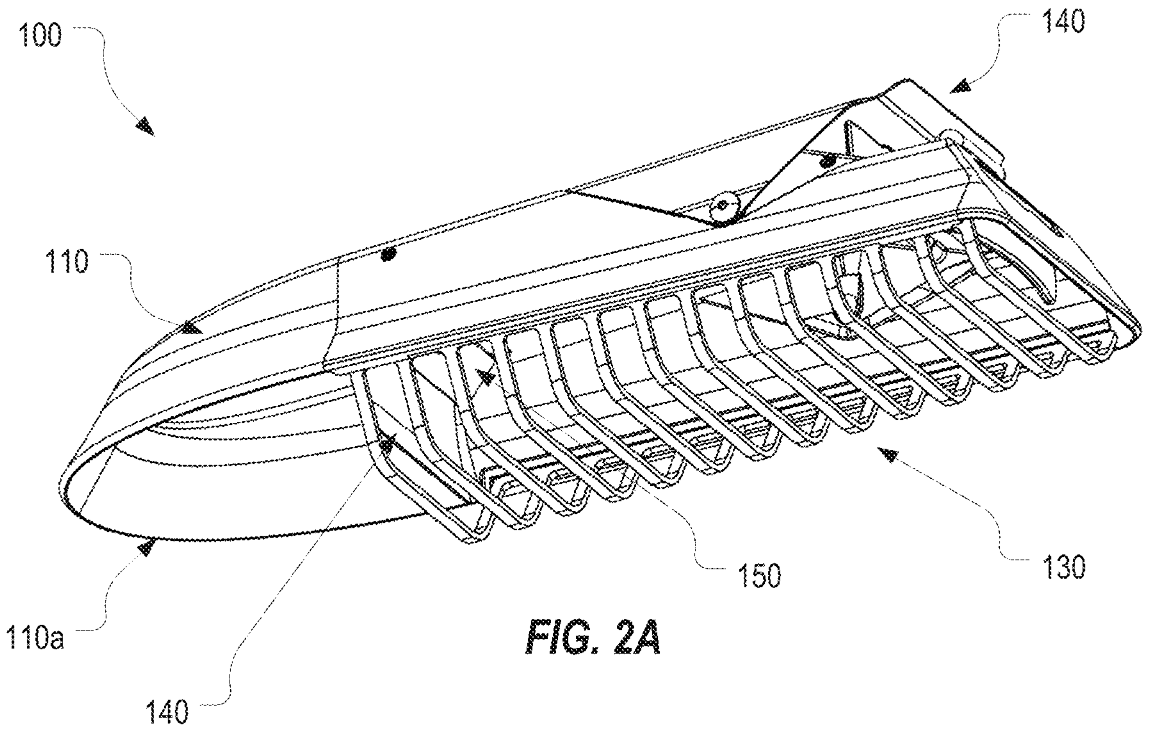
FIGS. 2A and 2B illustrate the example burrowing animal trap with a bottom cover removed.
Figure 2B:
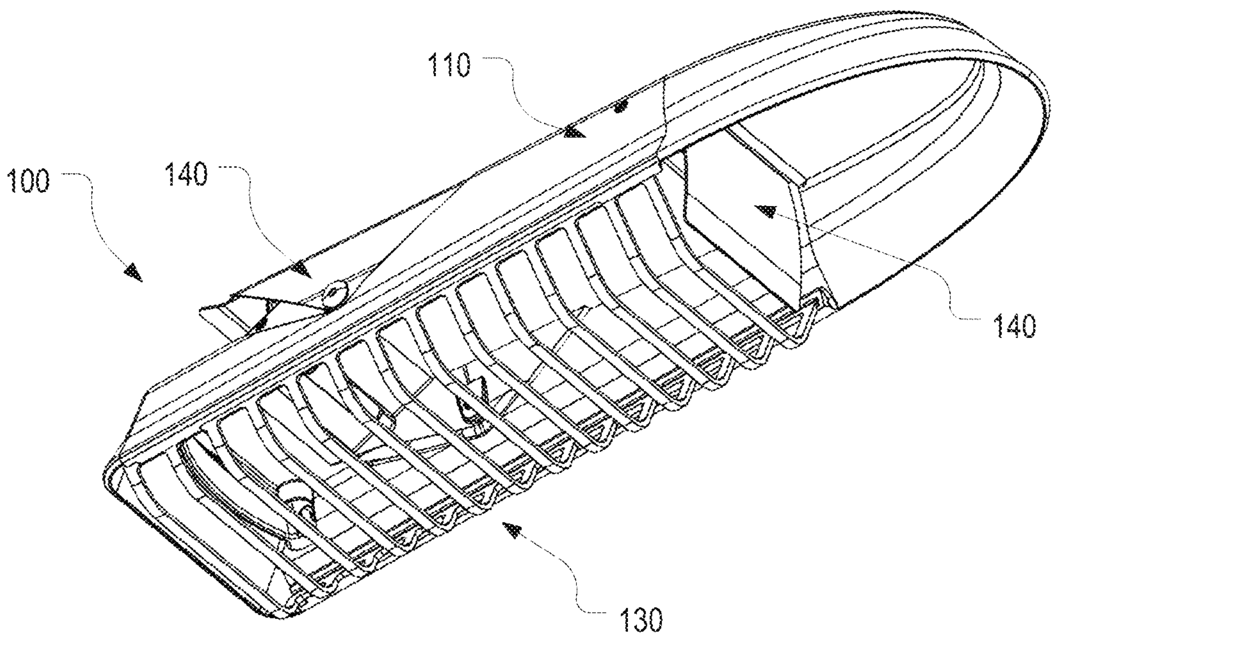

FIGS. 2A and 2B show trap body 100 with bottom cover 200 removed. Trap body 100 includes an enclosure 110 having a bottom 110*a* forming a downward-facing opening, a cage floor 130 that encloses a rear portion of the downward-facing opening, a capture mechanism 140 that is configured to selectively cover a frontward-facing opening formed between enclosure 110 and cage floor 130, and a slot cover 150 for blocking light from entering enclosure 110.

Figure 3A:
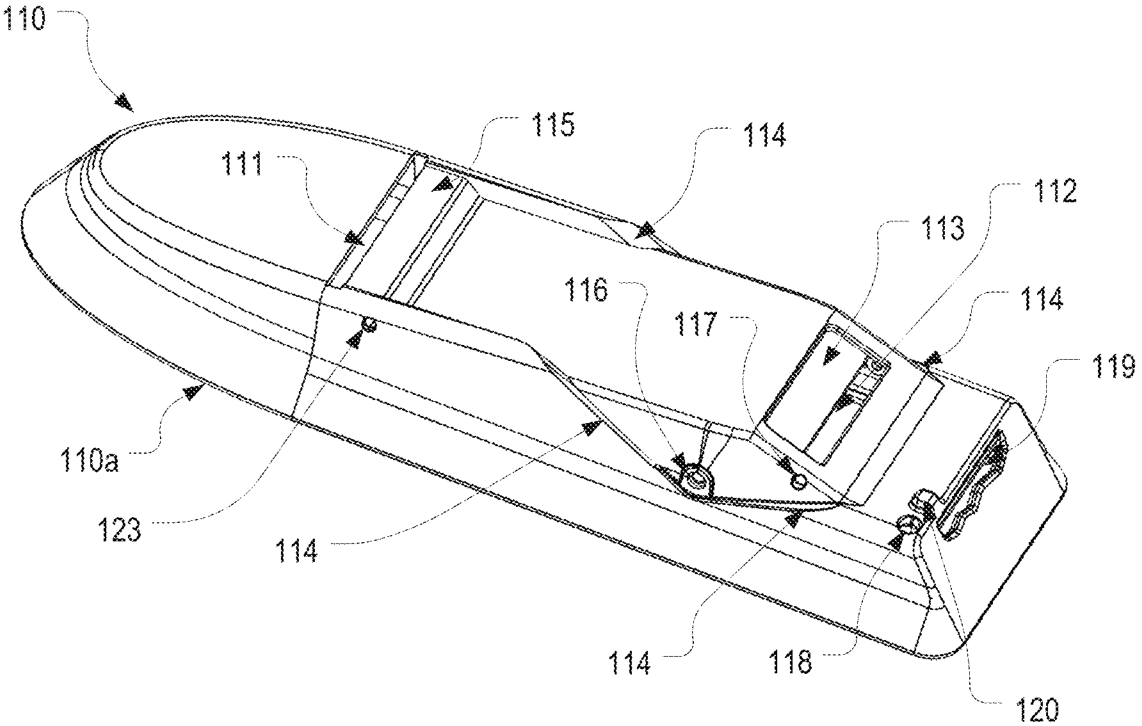
FIGS. 3A and 3B illustrate an enclosure of the example burrowing animal trap.
Figure 3B:
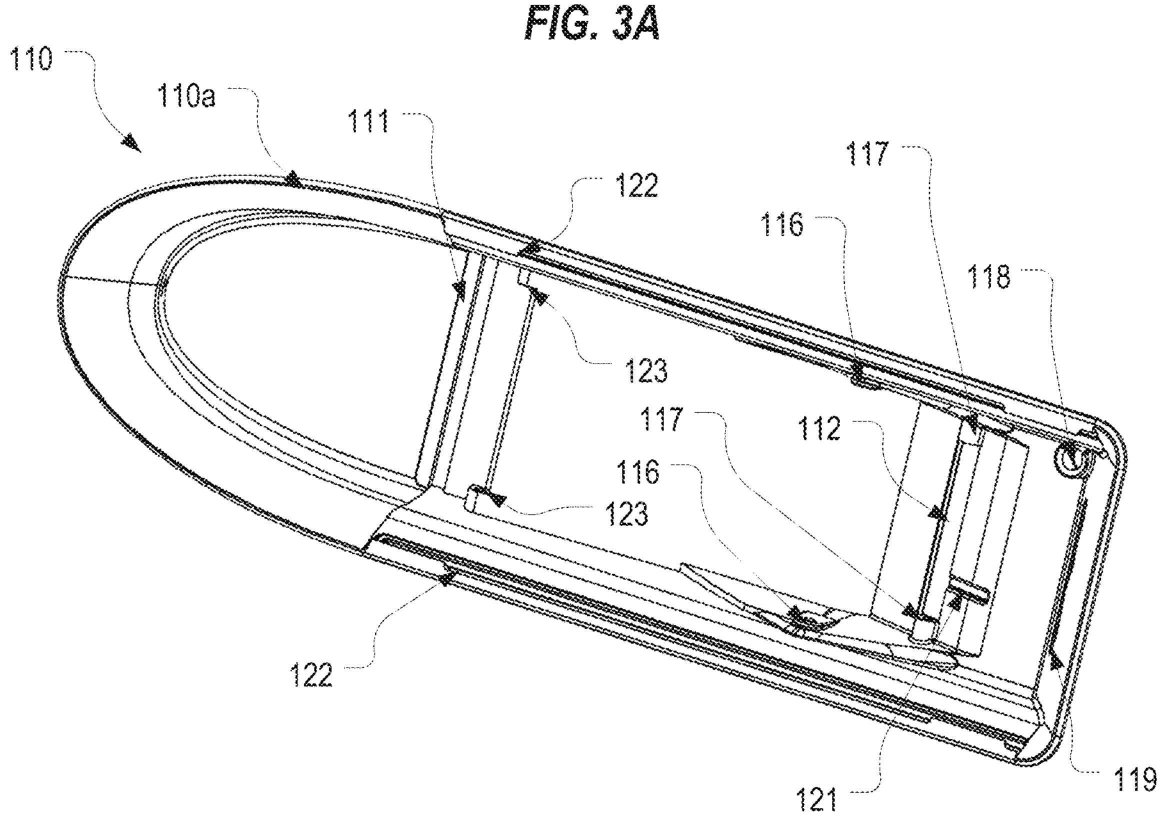
Figure 4A:
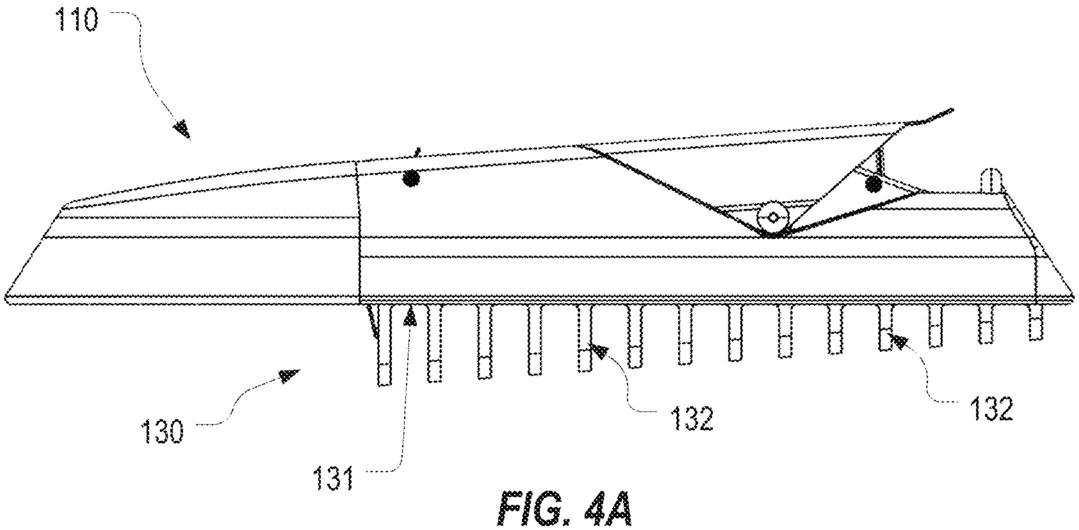
FIGS. 4A and 4B are side views of the example burrowing animal trap which illustrate a cage floor.
Figure 4B:
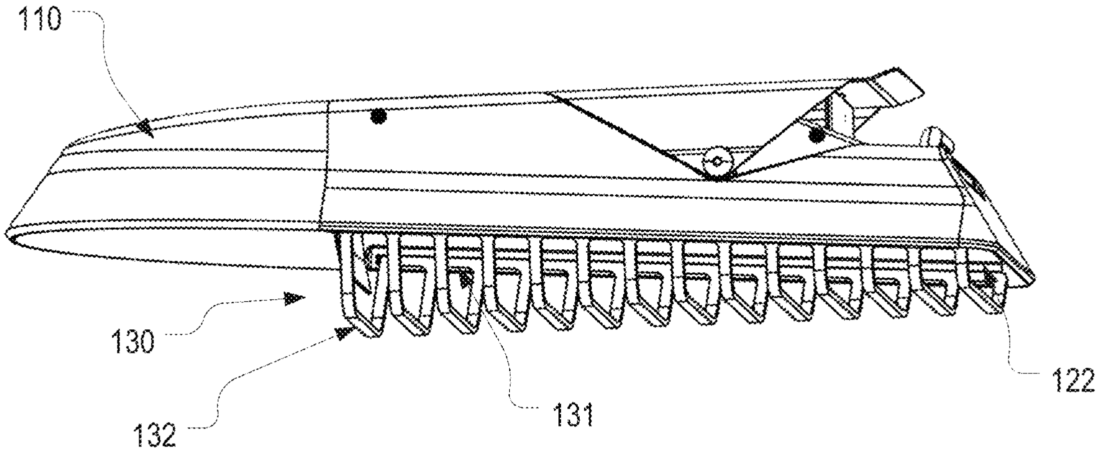
Figure 5A:
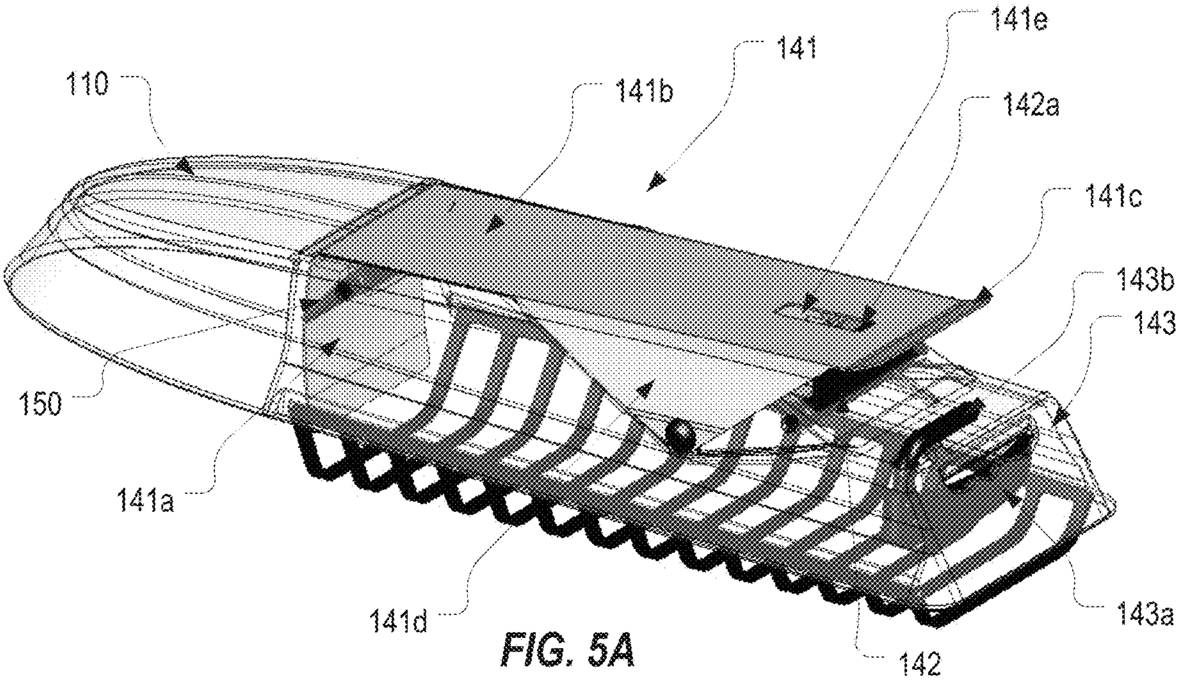
FIGS. 5A and 5B illustrate a capture mechanism of the example burrowing animal trap.

FIGS. 3A and 3B show enclosure 110 in isolation. FIGS. 4A and 4B are side views of burrowing animal trap 50 and provide details of cage floor 130. FIG. 5A, which shows enclosure 110 with transparency, and FIG. 5B, in which cage floor 130 is removed, provide details of capture mechanism 140.

Capture mechanism 140 includes a trap door 141, a biasing mechanism 142 and a trigger mechanism 143. Trap door 141 may include a front wall 141*a*, a top 141*b*, a rear 141*c*, sides 141*d*, an opening 141*e* in top 141*b*, and a slot 141*f*. Front wall 141*a* extends downwardly from a front of top 141*b*, whereas rear 141*c* forms an upwardly angled portion at the rear of top 141*b*. Sides 141*d* extend downwardly from the sides of top 141*b* and may have triangular shapes, the apexes of which may be secured to enclosure 110 via a pivoting connection. Accordingly, trap door 141 is configured to pivot relative to enclosure 110 as further described below.

Biasing mechanism 142 is a pivoting structure positioned below top 141*b* of trap door 141 and includes a biasing member 142*b* (e.g., a spring) that biases the pivoting structure into a vertical position (e.g., as shown in FIG. 5A). Biasing mechanism 142 can include a tab 142*a* that aligns with opening 141*e* in top 141*b*. Because biasing mechanism 142 is positioned to the rear of trap door 141's pivoting connection, biasing mechanism 142 applies an upward biasing force on the rear of trap door 141 such that front wall 141*a* is biased downwardly.

Trigger mechanism 143 includes a trigger 143*a* and a locking member 143*b*. As described in greater detail below, trigger 143*a* is positioned within enclosure where an animal or soil may contact it. Locking member 143*b* is configured to selectively secure rear 141*c* to retain trap door 141 in a set position.

Enclosure 110 includes a slot 111 through which front wall 141*a* inserts into enclosure 110 and an opening 112 through which biasing mechanism 142 extends out from enclosure 110. In some embodiments, opening 112 may be formed in/along a recessed portion 113 of enclosure 110's exterior. In some embodiments, the exterior of enclosure 110 may form stops 114 that slides 141*d* contact to thereby limit the movement of trap door 141. In some embodiments, the exterior of enclosure 110 may form a ledge 115 along and behind slot 111. Top 141*b* may rest on ledge 115 when front wall 141*a* is fully inserted through slot 111. In some embodiments, enclosure 110 may form pivot points (e.g., openings) 116 for trap door 141 and pivot points 117 for biasing mechanism 142. In some embodiments, enclosure 110 may form an opening 118 for trigger mechanism 143. In some embodiments, enclosure 110 may include an opening 119 for sunlight which is positioned at a rear of the enclosure. Opening 119 can create the illusion that enclosure 110 is an extension of the burrow. In some embodiments, enclosure 110 may form a support 120 for trigger mechanism 143. In some embodiments, enclosure 110 may include a channel 121 for biasing member 142*b*. In some embodiments, enclosure 110 may form a retaining structure 122 for cage floor 130. In some embodiments, an interior of enclosure 110 may form pivot points 123 for slot cover 150.

Cage floor 130 includes side members 131 and cross members 132 which, in some embodiments, may be formed from stamped metal, welded wire, or another suitable configuration. Side members 131 are configured to interface with retaining structure 122 to secure cage floor 130 to enclosure. Cross members 132 extend between side members 131 and may span from the rear of enclosure 110 up to the location of front wall 141*a* when front wall 141*a* is inserted into enclosure 110. Each cross member 132 may include opposing vertical portions and a horizontal portion that extends between the vertical portions. As best seen in FIG. 4A, the vertical portions of cross members 132 can be configured so that their height increases in the frontward direction. In other words, the horizontal portions of cross members 132 positioned at and near front wall 141*a* are spaced at a greater distance from bottom 110*a* than those positioned at and near the rear of enclosure 110. By configuring cage floor 130 with this sloped design, cross members 132 are less likely to be exposed above the soil at the entrance into enclosure 110 and can therefore minimize the likelihood that an animal will detect the trap. Bottom cover 200 can be shaped to generally match this sloped shape of cage floor 130. To facilitate stacking of traps 50, the top contour of enclosure 110 (and trap door 141 when closed) can be configured to run parallel with the sloped shape of cage floor 130.

Figure 5B:
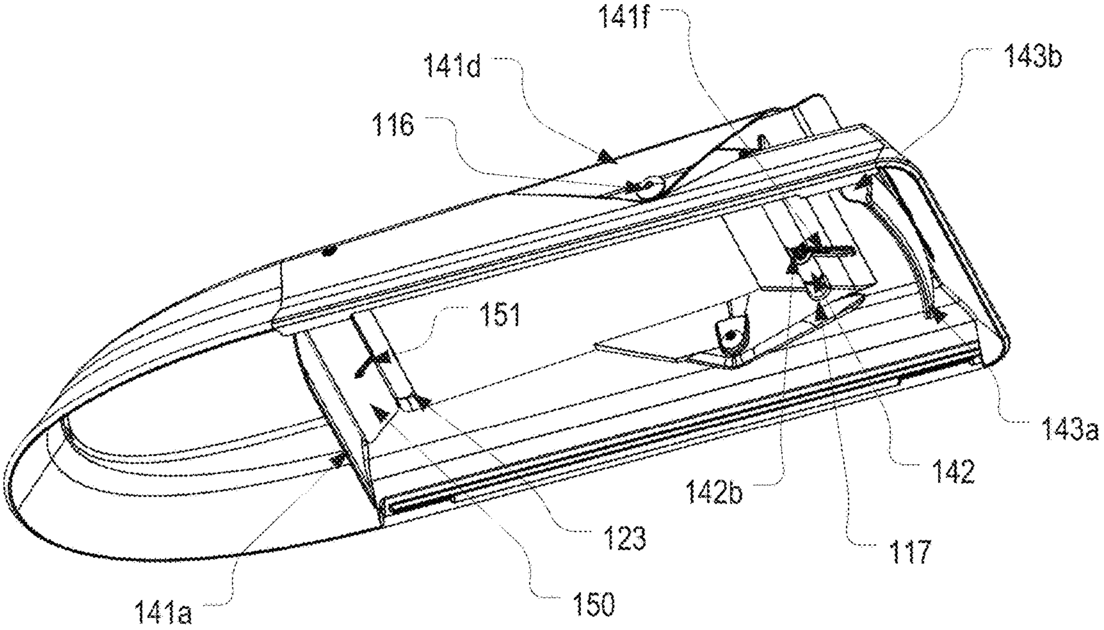

FIG. 5A shows enclosure 110 with transparency and FIG. 5B omits cage floor 130 to better illustrate how the various components interconnect and function. As shown, trap door 141 is coupled to enclosure 110 by sides 141*d* and via a pivoting connection. Front wall 141*a* descends into enclosure 110 via slot 111 to close the front-facing opening between enclosure 110 and cage floor 130. Biasing mechanism 142 biases trap door 141 into this closed position and also prevents pivoting of trap door 141 once in the closed position.

Slot cover 150 is configured to cover slot 111 when front wall 141*a* is lifted to thereby block light from entering through slot 111 and maintain the illusion that an animal is still in the burrow when entering enclosure 110. Slot cover 150 includes a biasing member 151 that biases slot cover 150 overtop slot 111 but also allows slot cover 150 to pivot downwardly out of the way as front wall 141*a* descends into enclosure 110.

Trigger 143*a* is positioned towards the rear of enclosure 110 and is configured to pivot between a set (frontward) and triggered (rearward) position. Locking member 143*b* is configured to pivot with trigger 143*a*. Accordingly, by rotating locking member 143*b* overtop rear 141*c* of trap door 141, trigger 143*a* will also be rotating frontward into its set position. Then, an animal or soil the animal may move can force trigger 143*a* rearward to thereby rotate locking member 143*b* off of rear 141*c*. Biasing member 142*b*, with the help of gravity, will then rotate trap door 141 causing front wall 141*a* to descend into and be held in the closed positioned to trap the animal within enclosure 110.

Figure 7A:
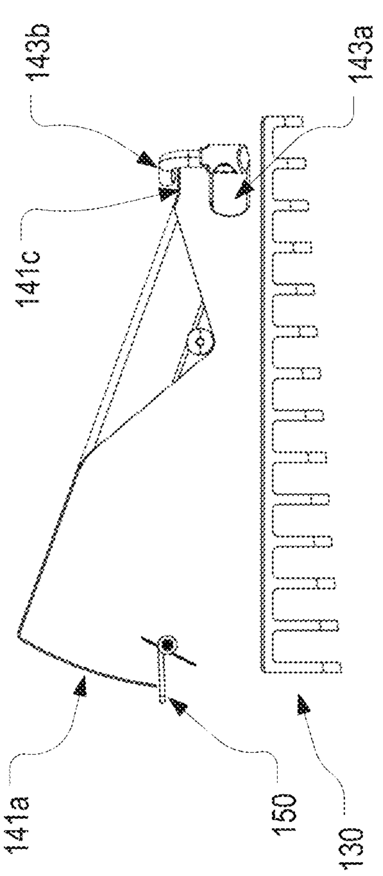
FIGS. 6A, 6B, 7A and 7B illustrate how the capture mechanism functions in one or more embodiments.
Figure 7B:
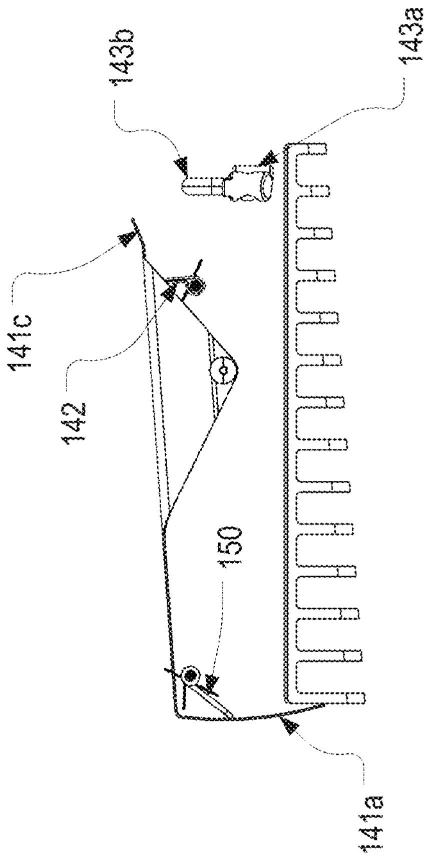
Figure 6A:
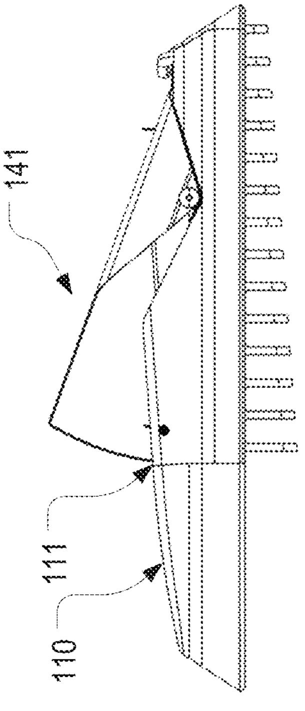
Figure 6B:
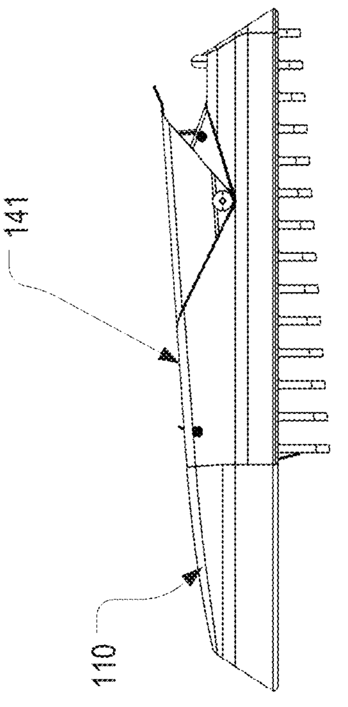
Figure 8:
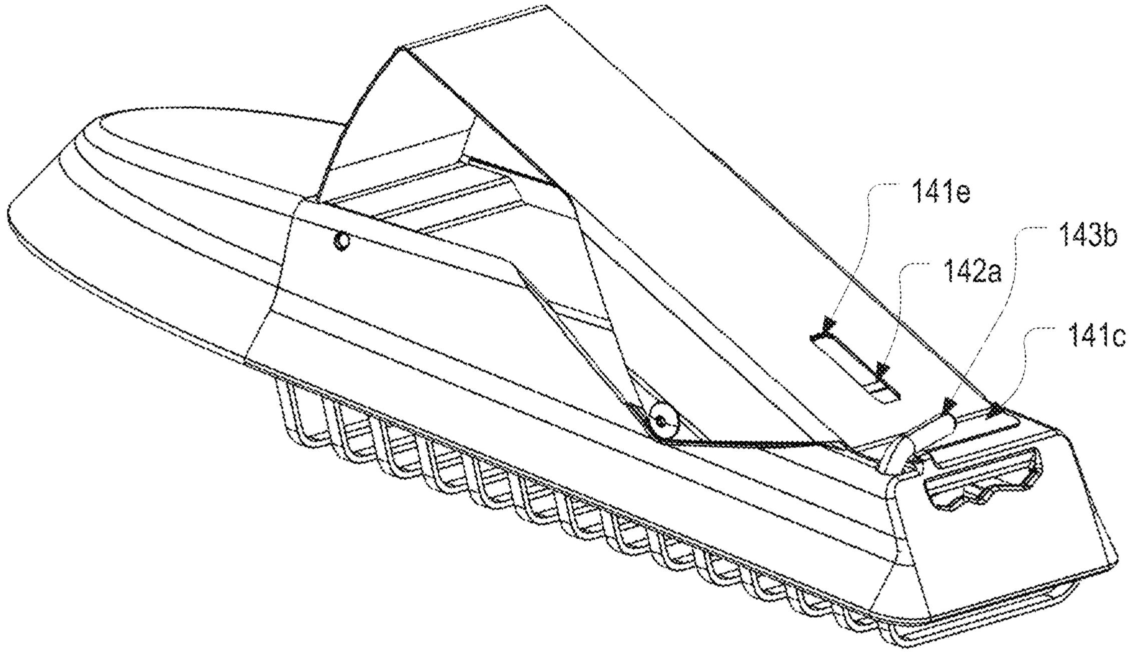
FIG. 8 provides another example of the capture mechanism when set.

FIGS. 6A and 6B are side views of burrowing animal trap 50 in the set and triggered positions respectively. FIGS. 7A and 7B are equivalent views of capture mechanism 140 in isolation. FIG. 8 is a rear view of burrowing animal trap 50 when set. In the bottom view of FIG. 9, cage floor 130 is removed to show trigger 143*a* when set. These figures further detail how burrowing animal trap 50 can be configured to function in some embodiments.

Figure 9:
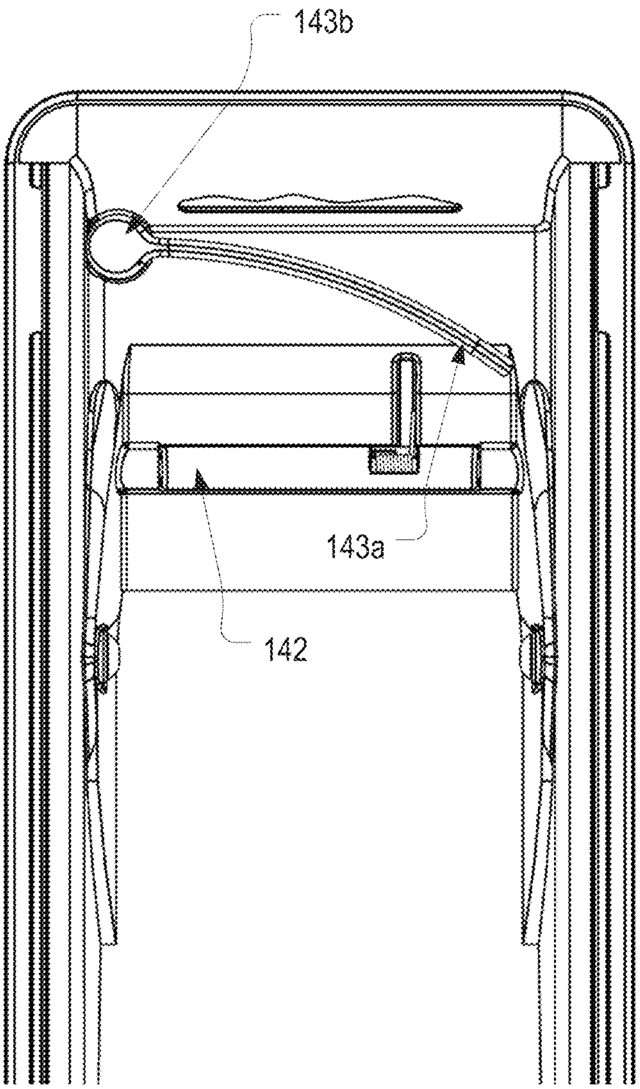
FIG. 9 is a detailed view of the trigger mechanism of the example burrowing animal trip when the capture mechanism is set.

With reference to FIG. 7B, when burrowing animal trap 50 is in the triggered (or unset) position, biasing mechanism 142 is in an upward orientation and prevents downward movement of the rear portion of trap door 141 which thereby prevents upward movement of front wall 141*a*. To transition burrowing animal trap 50 from the triggered position to the set position (i.e., to transition from FIG. 7B to FIG. 7A), the user can push tab 142*a* frontward via opening 141*e* while pushing downwardly on rear 141*c* to thereby pivot front wall 141*a* upwardly out from slot 111. As front wall 141*a* exits slot 111, slot cover 150 is biased overtop slot 111 to block light. Then, with rear 141*c* lowered, the user can rotate locking member 143*b* overtop rear 141*c* to retain trap door 141 in the set position as shown in FIG. 8. This rotation of locking member 143*b* also rotates trigger 143*a* frontwardly as shown in FIG. 9. Then, when an animal enters enclosure 110, it can contact trigger 143*a* and push it rearward which in turn rotates locking member 143*b* off of rear 141*c*. With locking member 143*b* no longer holding rear 141*c*, biasing member 142, in conjunction with gravity, causes trap door 141 to pivot back to the triggered position.

Burrowing animal trap 50 is designed to be more reliable even with the small forces that animals may apply. For example, all the components of capture mechanism 140 are connected to enclosure 110 via a pivoting connection. Such pivoting connections minimize friction (particularly in comparison to sliding components) which can cause capture mechanism 140 to be triggered by even a small force against trigger 143*a*.

What is claimed:

1. A burrowing animal trap comprising:

an enclosure having a downward-facing opening that is configured to be placed overtop an opening of a burrow;

a cage floor that encloses a rear portion of the downward-facing opening to thereby form a frontward-facing opening between the enclosure and the cage floor;

a capture mechanism that is configured to selectively cover the frontward-facing opening, the capture mechanism comprising a trap door having a top that is positioned external to the enclosure and is connected to the enclosure via a pivoting connection, a front wall that extends downwardly from the top and that is configured to extend into the enclosure to block the frontward-facing opening, and a rear that is positioned external to the enclosure, the front wall and the rear being positioned on opposite sides of the pivoting connection; and a trigger mechanism having a trigger that is positioned within the enclosure and a locking member that is positioned external to the enclosure and rotates with the trigger, wherein the locking member is configured to interface with the rear of the trap door to retain the front wall in a lifted position until the trigger is rotated.

2. The burrowing animal trap of claim 1, wherein the locking member is configured to rotate overtop the rear of the trap door to retain the front wall in the lifted position.

3. The burrowing animal trap of claim 2, wherein the rear is angled upwardly relative to the top of the trap door.

4. The burrowing animal trap of claim 1, wherein the trap door includes opposing sides that extend downwardly from the top, the opposing sides being connected to the enclosure to form the pivoting connection.

5. The burrowing animal trap of claim 1, wherein the front wall of the trap door has a curved shape.

6. The burrowing animal trap of claim 1, wherein the capture mechanism includes a biasing mechanism that biases the trap door to cause the front wall to extend into the enclosure.

7. The burrowing animal trap of claim 6, wherein the biasing mechanism is positioned below the top of the trap door on a rear side of the pivoting connection.

8. The burrowing animal trap of claim 7, wherein the biasing mechanism rotates rearwardly into a vertical orientation under the trap door.

9. The burrowing animal trap of claim 8, wherein the top of the trap door includes an opening by which the biasing mechanism may be accessed to rotate the biasing mechanism frontward.

10. The burrowing animal trap of claim 6, wherein the biasing mechanism includes a tab that is accessible through an opening in the top of the trap door to thereby allow a user to apply a frontward force on the tab.

11. The burrowing animal trap of claim 1, wherein the cage floor comprises cross members that extend across the enclosure, each cross member having vertical portions and a horizontal portion that extends between the vertical portions, wherein a height of the vertical portions increases in a frontward direction.

12. The burrowing animal trap of claim 11, wherein the height of the vertical portions of the cross members cause the cross members to extend along a first plane and wherein a top of the enclosure and the top of the trap door extend along a second plane that is parallel to the first plane.

13. The burrowing animal trap of claim 12, further comprising:

a bottom cover that selectively couples to the enclosure overtop the downward-facing opening, wherein a bottom of the bottom cover extends along a plane that is parallel to the first and second planes.

14. A burrowing animal trap comprising:

an enclosure having a downward-facing opening that is configured to be placed overtop an opening of a burrow;

a cage floor that encloses a rear portion of the downward-facing opening to thereby form a frontward-facing opening between the enclosure and the cage floor;

a capture mechanism that is configured to selectively cover the frontward-facing opening, the capture mechanism comprising a trap door having a top that is connected to the enclosure via a pivoting connection, a front wall that extends downwardly from the top and that is configured to extend into the enclosure to block the frontward-facing opening, and a rear, the front wall and the rear being positioned on opposite sides of the pivoting connection; and a trigger mechanism having a trigger that is positioned within the enclosure and a locking member that rotates with the trigger, wherein the locking member is configured to interface with the rear of the trap door to retain the front wall in a lifted position until the trigger is rotated;

wherein the enclosure includes a slot through which the front wall of the trap door extends into the enclosure, the burrowing animal trap further comprising:

a slot cover that covers the slot when the front wall is withdrawn from the slot.

15. The burrowing animal trap of claim 14, wherein the slot cover is configured to pivot away from the slot when the front wall extends through the slot and into the enclosure.

16. A burrowing animal trap comprising:

an enclosure having a downward-facing opening that is configured to be placed overtop an opening of a burrow;

a cage floor that encloses a rear portion of the downward-facing opening to thereby form a frontward-facing opening between the enclosure and the cage floor;

a capture mechanism comprising a trap door having a top that is connected to the enclosure via a pivoting connection and a front wall that extends downwardly from the top and pivots downwardly into the enclosure to block the frontward-facing opening; and a trigger mechanism having a trigger that is positioned within the enclosure and a locking member that rotates with the trigger, wherein the locking member is configured to interface with the trap door to retain the front wall in a lifted position until the trigger is rotated;

wherein the cage floor comprises cross members that extend across the enclosure, each cross member having vertical portions and a horizontal portion that extends between the vertical portions, wherein a height of the vertical portions increases in a frontward direction.

17. The burrowing animal trap of claim 16, wherein the trap door includes opposing sides that extend downwardly from the top, the opposing sides being connected to the enclosure to form the pivoting connection, and wherein the top and the opposing sides of the trap door are positioned external to the enclosure.

18. The burrowing animal trap of claim 16, wherein the capture mechanism includes a biasing mechanism that biases the trap door to cause the front wall to extend into the enclosure, wherein the biasing mechanism is positioned below the top of the trap door on a rear side of the pivoting connection.

19. The burrowing animal trap of claim 18, wherein the biasing mechanism rotates rearwardly into a vertical orientation under the trap door.

20. The burrowing animal trap of claim 19, wherein the top of the trap door includes an opening by which the biasing mechanism may be accessed to rotate the biasing mechanism frontward.

* * * * *